(12) United States Patent
Benassi et al.

(10) Patent No.: US 6,676,871 B1
(45) Date of Patent: Jan. 13, 2004

(54) GAS-PERMEABLE BUT LIQUID-IMPERMEABLE POLYOLEFIN MICROPOROUS FILMS

(75) Inventors: Guy Benassi, Saint Nicolas (BE); Christian Dubouchet, Seraing (BE); Michel Gillet, Awans (BE); Guy Pinchard, Housse (BE)

(73) Assignee: Ace S.A., Angleur (BE)

(*) Notice: Subject to any disclaimer, the term of this patent is extended or adjusted under 35 U.S.C. 154(b) by 0 days.

(21) Appl. No.: 09/744,403

(22) PCT Filed: Jul. 22, 1999

(86) PCT No.: PCT/IB99/01308

§ 371 (c)(1),
(2), (4) Date: Jan. 24, 2001

(87) PCT Pub. No.: WO00/05295

PCT Pub. Date: Feb. 3, 2000

(30) Foreign Application Priority Data

Jul. 24, 1998 (BE) .............................................. 9800562

(51) Int. Cl.⁷ ......................... B29C 47/06; B29C 55/06; B29C 67/20; C08J 5/18
(52) U.S. Cl. ............. 264/154; 264/173.14; 264/173.15; 264/210.6; 264/210.7; 264/211.12; 264/284; 264/342 RE
(58) Field of Search ..................... 264/41, 154, 173.14, 264/173.15, 210.6, 210.7, 211.12, 284, 342 RE (56) References Cited

U.S. PATENT DOCUMENTS

| | | |
|---|---|---|
| 4,350,655 A | 9/1982 | Hoge |
| 4,472,328 A | 9/1984 | Sugimoto et al. |

(List continued on next page.)

FOREIGN PATENT DOCUMENTS

| | | | |
|---|---|---|---|
| CA | 1 175 226 | | 10/1984 |
| EP | 0066672 A2 | * | 12/1982 |
| EP | 0203017 A1 | * | 11/1986 |
| EP | 0227037 A2 | * | 7/1987 |
| EP | 0232060 A2 | * | 8/1987 |
| EP | 0253667 A2 | * | 1/1988 |
| EP | 0258154 A1 | * | 3/1988 |
| EP | 0283200 A2 | * | 9/1988 |
| FR | 2556648 A1 | * | 6/1985 |
| WO | WO-96/19346 A2 | * | 6/1996 |

OTHER PUBLICATIONS

International Search Report dated Oct. 20, 1999.

Primary Examiner—Leo B. Tentoni
(74) Attorney, Agent, or Firm—McCarter & English (57) ABSTRACT

The invention concerns a method for producing a microporous film with strong isotropic tendency permeable to gases and impermeable to aqueous liquids, consisting of at least one layer, comprising the following successive steps: preparing a mixture consisting of a polyolefin matrix containing at least a polymer and at least a mineral and/or organic filler; extruding at least a ply by hot-casting the mixture; pre-stretching the ply with a drag roll; cooling and solidifying the pre-stretched ply, using the drag roll; drawing the solidified ply at sufficient temperature for forming the microporous film. The invention is characterised in that the cooling of the pre-stretched melting ply with the drag roll is partial and limited in controlled manner at a temperature in the temperature range required for its drawing; the drawing of the ply, brought to the temperature required for drawing, by the partial cooling is carried out by traction, at the time of its tangential separation from the drag roll, said roller acting as take-up roller for drawing. Said microporous film can be used on its own or combined with other porous supports for various applications such as corporal hygiene articles, dressings, medical articles, protective clothing, sportswear, insulating coats in the building industry, and the like.

52 Claims, 1 Drawing Sheet

U.S. PATENT DOCUMENTS

| | | |
|---|---|---|
| 4,705,812 A | 11/1987 | Ito et al. |
| 4,705,813 A | 11/1987 | Ito et al. |
| 4,777,073 A | 10/1988 | Sheth |
| 4,803,231 A | 2/1989 | Seinera et al. |
| 4,814,124 A | 3/1989 | Aoyama et al. |
| 4,829,096 A | 5/1989 | Kitamura et al. |
| 4,889,879 A | 12/1989 | Seinera et al. |
| 4,921,652 A | 5/1990 | Tsuji et al. |
| 4,921,653 A | 5/1990 | Aoyama et al. |
| 4,929,303 A | 5/1990 | Sheth |
| 5,055,338 A | 10/1991 | Sheth et al. |
| 5,888,434 A * | 3/1999 | Mahoney et al. ......... 264/41 X |

* cited by examiner

FIG. 1

GAS-PERMEABLE BUT LIQUID-IMPERMEABLE POLYOLEFIN MICROPOROUS FILMS

BACKGROUND OF THE INVENTION

1. Field of the Invention

The invention relates to pliant, flexible and breathable polyolefin microporous films formed from at least one layer, which are permeable to gases and water vapor but impermeable to aqueous liquids, have high mechanical properties and have a pleasant feel.

The invention also relates to a process for producing, by flow extrusion, polyolefin microporous films consisting of at least one layer, which films are permeable to gases and water vapor but impermeable to aqueous liquids, have high mechanical properties and have a pleasant feel.

Finally, the invention relates to the use of the aforementioned films by themselves or combined in the form of a complex with other porous supports.

2. Description of Related Art

It has been known for a long time how to produce pliant and flexible microporous films having the ability to breathe, that is to say to be permeable to gases and to water vapor but impermeable to aqueous liquids, and to combine them with other materials such as macro perforated films, nonwoven fabrics, woven fabrics and papers, these other materials providing the mechanical properties and the desired feel, particularly the textile feel.

The most conventional method for producing these microporous films consists in preparing a compound formed from a matrix of thermoplastic polymers having elastic properties and from a pulverulent, generally inorganic, filler, in flow-extruding this compound in the melt into the form of a thick web, in taking this thick web up by means of a metal roll (the surface of which may be provided with patterns in order to emboss the web) having a function of prestretching the molten web and cooling it, then in stretching it at least uniaxially, after having reheated it to a temperature favorable for this operation, in order to obtain the desired film.

During the stretching (post-cooling) allowing the thick web to pass into the state of a thin film, the inorganic filler particles dispersed within the thermoplastic polymer matrix are at least partially separated from the polymer material by a mechanical effect, creating microchannels within and passing through the thickness of the film.

The choice of the hydrophobic character of the polymer matrix and that of the inorganic filler, and in particular the size of its particles, the quality of the dispersion of the filler within the polymer matrix and the choice of stretch ratio applied to the web in order to form the film, are as many factors which favor the creation of these microchannels (the equivalent diameter of which is a few microns) and which give the film its porosity with respect to gases and its impermeability to aqueous liquids.

The prior art shows that microporous breathable films have formed the subject of considerable research relating to:

the composition of the polymer matrix and the mineral fillers, such as calcium carbonate and barium sulfate (U.S. Pat. No. 4,472,328) and the addition of elastomers (such as polybutadiene) in order to improve the stretchability;

the process for manufacturing the film, and in particular an operation of embossing the flow-extruded and slightly stretched web, in order to create variations in film thickness (2 $\mu$m to 3 mm) therein over very short distances, and also the process of combining it with other materials in order to increase the mechanical strength and/or the quality of the feel.

By way of illustration, mention may firstly be made of European Patent EP 232 060 which describes a process for producing a gas-permeable porous film according to the following steps, which comprises:

forming a compound from a polyolefin resin and an inorganic filler;

flow extruding a ribbon from the molten compound;

prestretching, embossing and cooling the molten ribbon on a metal roll in order to give it a rough configuration;

and finally carrying out the stretching proper, uniaxially or biaxially, after reheating it, so as to form the microporous film and impart a macromolecular and crystalline orientation sufficient to give it all the desired properties.

According to that process:

the polyolefin resin may comprise homopolymers, such as polypropylene, low-density polyethylene, linear low-density polyethylene, high-density polyethylene and polybutylene, copolymers, such as ethylene-propylene copolymer and ethylene-vinyl acetate copolymer, or blends of these polymers. Particularly preferred are polypropylene, low-density polyethylene, linear low-density polyethylene or high-density polyethylene, or a blend of two of more of these polymers;

and the inorganic filler is preferably barium sulfate or calcium carbonate.

Within this same context, another process may also be cited, this having formed the subject of European Patent No. EP 283 200. This other process appears to be very similar to that described in the above patent since it is carried out according to the same steps but which, however, is distinguished therefrom:

by the composition of the film formed, which is a blend of a single ethylene/$C_4$ to $C_{10}$ alpha-olefin copolymer and of an inorganic filler (calcium carbonate);

and by the pattern of the embossing which appears to be a selection of a geometrical shape (hexagonal, circular or diamond shape).

In either of these processes, the molten compound forming the composition of the film is flow-extruded in the form of a hot thick web. This web is almost simultaneously prestretched, cooled and embossed by means of a metal cooling and embossing roll which is provided with a surface pattern, bringing the thickness of the completely cooled web to about 100–150 $\mu$m.

Since the embossed web coming from the embossing operation does not yet have the desired characteristics for the microporous film, such as, in particular, a small thickness and a microporosity giving it the ability to breathe while being impermeable to aqueous liquids, or mechanical properties necessary for its subsequent use, it undergoes, after having been reheated to the suitable temperature (for example by calendering), a stretching operation between two pairs of rollers (forming a stretching rig) which rotate at different speeds.

The first pair of rollers constitutes the forwarding pair which simultaneously fulfils the roles of delivering the embossed ribbon to be stretched and possibly of being an aid for maintaining the delivered web at the desired temperature for stretching.

The second pair of rollers constitutes the pair for the actual stretching of the reheated embossed ribbon, by applying the desired stretch ratio to it, this ratio being given by the ratio of the linear speed delivered by the pair of stretching rollers to that delivered by the pair of forwarding rollers.

After the stretching operation, the film made according to the process may undergo a heat treatment, generally under tension in order to control its shrinkage.

Thus, it is obvious that the prestretched molten web entering the embossing zone is consequently and almost fully cooled therein and that this embossed web has to be reheated to a temperature sufficient to be able to be correctly stretched in the appropriate stretching zone and converted as far as possible into a film having the expected properties.

However, when the web coming from the flow extrusion is prestretched, cooled and embossed, the constituent material of the web, which is initially in an almost isotropic state, undergoes internal physical modifications during these steps, particularly macromolecular deformations and/or a macromolecular orientation and/or change in the crystallinity, these being frozen-in during the cooling.

Although the web coming from the embossing/cooling is reheated in order to undergo in the best possible state the actual stretching step (between the two pairs of rollers), this reheating appears always to be insufficient to completely release the material of the web from its internal state frozen by the cooling. This is why the final stretching of the embossed web takes place on an already stressed material, which adds further stresses to those existing at the time of stretching. This accumulation of internal stresses is manifested by the amount of shrinkage by heating the film leaving the stretching unit, which often requires post-stretching thermal stabilization in order to at least partially remove these stresses.

Consequently, the film coming from the prestretching, cooling, embossing and then stretching steps according to the prior art cannot be in a sufficiently isotropic physical state as is desirable even if it has, by virtue of these steps, many desirable characteristics.

SUMMARY OF THE INVENTION

This why:
a first object of the invention is to provide an improved process for manufacturing a microporous film which is permeable to gases and to water vapor but impermeable to aqueous liquids, is at least a monolayer and is polyolefin-based, another object of the invention is to provide a process for manufacturing a microporous film, which is at least a monolayer, having a physical state with a high isotropic tendency after stretching the cooled web, that is to say an essentially amorphous and homogeneous physical state;

another object of the invention is to have a microporous film, which is at least a monolayer, having satisfactory permeability to gases and impermeability to aqueous liquids, formed by at least uniaxially stretching at least one web prepared from a compound based on at least one polyolefin polymer and at least one mineral and/or organic filler.

Consequently, the invention relates both to an improved process for producing an at least monolayer microporous film permeable to gases but impermeable to aqueous liquids, and to the film itself.

According to the invention, the process for producing a microporous film having a high isotropic tendency, permeable to gases but impermeable to aqueous liquids, being composed of at least one layer, comprising the following successive steps:

preparing a compound composed of a polyolefin matrix comprising at least one polymer and at least one mineral and/or organic filler;

extruding a web comprising at least one layer by melt flow of the compound;

prestretching the web by a drive roll;

cooling and solidifying the prestretched web, by means of the drive roll;

stretching the web, at the temperature suitable for forming the microporous film, is characterized in that:

the cooling of the prestretched molten web by the drive roll is partial and limited in a controlled manner to a temperature lying within the range of temperatures necessary for stretching it;

the web taken to the necessary temperature by the partial cooling is stretched by pulling it at the moment when its tangential separation from said drive roll takes place, said roll acting as a forwarding roller for the stretching operation.

According to the invention, the microporous film, permeable to gases but impermeable to aqueous media, is characterized by an isotropic, homogeneous and partly amorphous physical state.

DETAILED DESCRIPTION OF THE INVENTION AND PREFERRED EMBODIMENTS

Thus, according to the invention, the web flow-extruded into at least one layer and prestretched is only partially cooled, and in a controlled manner, by the drive roll in order to be taken to a temperature lying within the desired temperature range for stretching said web and giving it the most complete isotropy characteristics, having fewer internal stresses, whereas according to the abovementioned prior art the extruded and prestretched web is cooled without any precaution and without any limit by passing it over the cooling and embossing roll and consequently has to be reheated to the temperature necessary for stretching it, in order to be able to be stretched: the stretched film resulting from the prior art is only partially isotropic, as revealed by its high shrinkability.

This is why, in the process according to the invention, the isotropic characteristics of the extruded and prestretched web are basically undisturbed by the partial cooling carried out in a controlled manner, but they are fully available at the moment when the web reaches the stretching zone in order to undergo therein this operation which takes place smoothly, generally with a stretch ratio of less than that used in the prior art, giving the film obtained all the desired physical and mechanical properties, and in particular a highly isotropic state.

Thus, in contrast to the process of the invention and according to the prior art, it seems that:

the fact of uncontrollably cooling the prestretched extruded web on the drive roll causes the internal characteristics obtained during the prestretching to be fixed;

the fact of reheating said web, for the stretching operation, after it has been uncontrollably cooled does not allow the film obtained to have an internal state with an isotropic tendency close to that of the post extrusion web.

Composition used for Producing the Film

The polyolefin microporous film according to the invention, permeable to gases and water vapor but impermeable to aqueous liquids, is composed of a polymer matrix comprising at least one polyolefin polymer and at least one mineral and/or organic filler.

The polyolefin microporous film according to the invention may comprise a single layer, called main layer, or be formed from several layers joined together, it being possible for each layer to be produced from a particular composition which is specific to it.

When the microporous film according to the invention is formed from a single layer, obtained by stretching an extruded web having a high filler content, this stretched layer must exhibit excellent mechanical properties, particularly a very high tensile strength, in order to withstand, without any damage, the stresses to which it is subjected in its various applications. This is why the polyolefin matrix is essentially composed of at least one polymer meeting this requirement for excellent mechanical strength, which, for this reason, requires a rather high density leading de facto to a high melting point.

However, this layer, within which certain internal stresses are generated by the stretching operation, may have certain drawbacks during the subsequent operations, such as:

heat-welding of the film to itself or to other materials, which welds may be produced over the entire surface of the film or only at points distributed over the surface of said film;

or the application of hot-melt adhesives in order to create complex structures with other flat products, such as nonwoven fabrics; during which the internal stresses relax due to the effect of the heat causing the film to shrink.

This is why it may be advantageous for the microporous film according to the invention to be formed from several layers, a main layer having a high mechanical strength (like that mentioned in the case of a monolayer film) combined with at least one other so-called specific layer, the polyolefin matrix of which may be formed not only from the polymer or polymers used in the formation of the main layer and secondary layers but also from at least one specific olefin polymer and/or copolymer due to the effect imparted to the specific layer containing it, such as:

a low density and consequently a lower melting point, allowing, for example, better adhesion to the cooling roll, very high stretch ratios, great ease of being welded to itself or to other materials, easy application of hot-melt adhesives, a great deal of freedom for creating complex structures by combining with other materials, without causing the main layer of the microporous film to shrink;

a higher density and a higher melting point in order to create affinities with other associated materials (for example nonwoven fabrics), by hot calendering for example;

modification of the polarity of said specific layer with respect to the main layer;

modification to the surface finish in order to create nonslip, antiblocking or antistatic effects in said specific layers, particularly when they are in the external position;

a combination of various olefin polymers and/or copolymers in order to create a multilayer film, each layer of which has its own function by virtue of its own composition.

If the polyolefin microporous film comprises a single so-called main layer, this layer is formulated in such a way that it provides the film produced with the abovementioned essential and optimum mechanical properties.

In the case of a monolayer film, the polyolefin matrix comprises one or more olefin polymers and/or copolymers obtained by polymerization in the presence of catalysts of the Ziegler-Natta type or of the metallocene type, used by themselves or as a mixture, which are chosen from the group consisting of plastomeric polyolefins such as ethylene/alpha-olefin copolymers, homopolymer polyethylenes (radical low-density polyethylenes) or ethylene/alpha-olefin copolymers (high-density linear, low-density linear and very low-density linear copolymers), ethyl/vinyl acetate (EVA), ethylene/methyl acrylate (EMA), ethylene/ethyl acrylate (EEA) and ethylene/acrylic acid (EAA) copolymers, and ionomers, homopolymer polypropylenes, metallocene polypropylenes and propylene/ethylene and propylene/alpha-olefin copolymers.

The (nonpolar) polyolefins used in the composition of the matrix have a density which lies within the 0.865 to 0.965 g/cm$^3$ range and preferably within the 0.900 to 0.935 g/cm$^3$ range.

The filler of mineral origin used in the composition of the film according to the invention may be chosen from the group consisting of calcium carbonate, talc, a clay, kaolin, silica, diatomaceous earth, magnesium carbonate, barium carbonate, magnesium sulfate, barium sulfate, calcium sulfate, aluminum hydroxide, magnesium hydroxide, calcium oxide, magnesium oxide, zinc oxide, titanium oxide, alumina, mica, glass powder, a zeolite or other materials, and preferably calcium carbonate nd barium sulfate, used by themselves or as a mixture.

The filler of organic origin used in the composition of the film according to the invention may be chosen, for example, from the group consisting of cellulose powders, powders of polymers such as polyurethane, epoxy, ABS, polyfluorinated polymers, polyamides, polyesters or other polymers, some of these powders being prepared by cryogenic grinding, used by themselves or as a mixture.

The size of the mineral and/or organic filler particles is generally chosen to be less than 40 $\mu$m and preferably between 0.5 and 10 $\mu$m.

The amount of filler used in the preparation of the composition of the film is generally between 50 and 500 parts by weight and preferably from 80 to 400 parts by weight per 100 parts by weight of the polyolefin matrix, it being understood that outside these extreme limits the porosity of the film may be insufficient if there is not enough filler and the stiffness of the film may be too great if there is an excess of said filler, causing, in the latter case, a difficult stretching operation.

Before introducing it into the polyolefin matrix, it may be advantageous for the mineral filler to undergo a surface treatment by means of a well-known treatment agent chosen from the group of fatty acids or their salts, silicone oils and silanes, this treatment favoring the dispersion of the mineral filler within said matrix.

However, it may also be advantageous to introduce, into the polyolefin matrix, at the same time as the mineral and/or organic filler, a dispersing agent (in a small amount) having the property of favoring the dispersion of the filler within the polyolefin matrix, of enabling the amount of filler in the said matrix to be increased and of preventing the formation of agglomerates of filler particles in the flow-extruded web and then in the film obtained by stretching. Such agglomerates may be the cause of instantaneous defects (tears) or subsequent defects (local macroporosity and liquid permeability) which are to the detriment of the quality of the microporous film. Such an agent, used according to the invention, may satisfy the following general formula, which includes at least one free-acid functional group:

in which (P) represents ethylene oxide, (Q) represents propylene oxide, x and y taking values such that their sum lies within the 0 to 24 range, and R is a saturated or unsaturated, linear or nonlinear alkyl radical, an aryl radical, an alkyl-aryl radical, a saturated or unsaturated heterocycle, containing from 5 to 28 carbon atoms and preferably from 8 to 24 carbon atoms, or else a steroid radical. Said radical R may or may not also be branched and/or comprise one or more functional groups of the halogen, —OH, —COOH, —COOR, —NO$_2$, —NH$_2$, —CONH$_2$, —CN, sulfonic, sulfuric, phosphonic or phosphoric type and Z may be one of the carboxylic, sulfonic, sulfuric, phosphonic and phosphoric functional groups.

If Z comprises several acid functional groups, at least one of them is free, the others possibly being salified or esterified by means of an alcohol of formula R'—OH in which the radical R' may be a carbon chain containing 1 to 4 carbon atoms or one of the radicals belonging to the group defined above for R, it being possible for the radical R' to be identical to the radical R.

Thus, agents for treating the surface of the mineral and/or organic filler and/or dispersing agents for said mineral and/or organic filler within the polyolefin matrix help to obtain the best dispersion of the filler in the polyolefin matrix and consequently to increase the stretchability of the film, by further improving its fineness characteristics (reduced final thickness) and its microporosity, resulting in a more breathable film.

The compound formed by the polyolefin matrix and the filler may also receive other active agents such as lubricants, pigments, dyes, heat stabilizers, photochemical stabilizers, fire retardants, plasticizers and antistatic agents. This compound may result, in particular, and in a preferred manner, in the production of a bactericidal and acaricidal microporous film by introducing (into said compound) suitable biocides.

If the polyolefin microporous film comprises several layers, the composition of the main layer is the same as that mentioned in the case of a monolayer breathable microporous film. The other layer or layers, called specific layers, combined with the main layer are produced by means of particular compositions which differentiate them from the main layer and which may also differentiate them among themselves in the case of a multilayer film, each specific layer possibly having a particular function.

The polyolefin matrix of the specific layers is composed of at least one olefin polymer and/or copolymer which is specific owing to the effect that it imparts to the layer containing it, and more specifically polyolefins of very low density (0.865 to 0.915 g/cm$^3$) and/or of low melting point (from 60 to 100° C.), polyolefins of higher density (from 0.920 to 0.965 g/cm$^3$) and/or of high melting point (from 100 to 160° C.), polyolefins having a polar tendency, particularly ethylene/vinyl acetate, ethylene/methyl acrylate, ethylene/ethyl acrylate, ethylene/acrylic acid copolymers, ionomers, and polyolefins modifying the surface finish of the layer, in particular in order to allow good adhesion to polar products such as cellulose (paper) fibers, polyester fibers, viscose fibers and other fibers.

However, the polyolefin matrix of the specific layers may also comprise the olefin polymer(s) and/or copolymer(s) used in said main layer.

The polyolefin matrix of each specific layer is composed of 5% to 100% by weight, and preferably of 15% to 100% by weight, with respect to the total mass of said matrix of at least one specific olefin polymer and/or copolymer and of at most 95%, and preferably 85%, of at least one olefin polymer and/or copolymer used in the composition of the matrix of the main layer.

The layers other than the main layer may also contain at least one mineral and/or organic filler chosen from the abovementioned groups and in amounts chosen within the ranges also already mentioned in the case of the main layer.

The compound according to the invention, comprising a polyolefin matrix and a mineral and/or organic filler, may be prepared according to known methods, it being understood that the means used for applying these methods do indeed result in the production, by flow extrusion, of a melt in which the mineral and/or organic filler is correctly dispersed, that is to say is free of agglomerates.

One of the methods may consist in using the various constituents in a multi-feed twin-screw extruder and in flow-extruding the melt. Another method may consist in preparing, by extrusion, granules of a masterbatch by dispersing the filler in a fraction of the polymers constituting the polyolefin matrix and then in diluting this masterbatch in the remaining fraction of the polyolefin matrix, or by using a masterbatch composed of the composition, and in flow-extruding the melt.

Process for Producing the Film

Once each compound needed for producing each layer (consisting of the polyolefin matrix and the filler according to the layer to be produced) has been prepared, these compounds may be melt-processed in order to produce a breathable microporous film formed from one or more layers.

According to the process of the invention for producing a microporous film, comprising at least one layer, the melt is hot flow-extruded through a flat die in order to form a molten web by means of the polyolefin matrix, with a thickness of between 300 and 2000 μm on exiting the die.

The temperature of the die and of the molten web at the moment of extrusion is between 170° C. and 270° C.

The thick web formed is prestretched by a drive roll, having a generally metallic surface, combined with a back-up roll having, for example, a rubberized surface, or with an air knife, by subjecting it to a stretching operation, the stretch ratio of which is generally between 4 and 25, and preferably between 5 and 10, between the point where it leaves the extrusion die and the point where it comes into contact with the drive roll.

According to the invention, the web prestretched by the drive roll is partially cooled thereon, by coming into contact with it, down to the temperature necessary for its subsequent stretching, and subsequently solidified, in a controlled manner. To do this, the temperature of the roll is controlled in such a way that the temperature of the web in contact with it is brought, by controlled cooling, to the temperature necessary for stretching it, i.e. brought into a range of temperatures suitable for carrying out the stretching of the web under the best thermal conditions: the temperature given to the web in contact with the drive roll is chosen within the 40° C. to 165° C. range and preferably within the 55° C. to 135° C. range.

The surface of the roll for driving the web may be a smooth surface of the shiny or matt type.

However, to avoid any risk of the prestretched web slipping on the drive and cooling roll, the surface of said roll may be formed from a structure having a surface with a high friction coefficient, either by the material used for said surface or by creating, on this surface, a regular or irregular, or even random, surface structure, such as, for example, a sand-blasted, satin-finish, speckled or other appearance.

When prestretching the web, cooling it in a controlled manner to a defined temperature and partially solidifying it, said web may also undergo an embossing operation by means of said roll. In the latter case, the surface of the drive roll is provided with a regular or irregular pattern, in the form of projections or of indentations, the most frequent shapes of which may be lines in the longitudinal, transverse or diagonal direction with respect to the direction of advance of the web, these being parallel or intersecting one another in order to form geometrical figures, chevrons of greater or lesser flare angle, sinusoids, toothings, or else figures such as polygonal or circular figures (for example hexagons, diamonds, circles), or figures having a random distribution.

The time during which the web is in contact with the drive roll, which allows the web to be put into the best temperature range for the stretching operation by cooling it in a controlled manner, may be controlled through the use of a back-up roll placed in the exit zone tangential to said web. This back-up roll makes it possible to fix the length of the arc over which the web is in contact with the drive roll, that is to say to set the degree of wrap of the roll by the web by imposing on it the instant when the web leaves said roll tangentially. Thus, the web is optimally prepared for undergoing the stretching operation under the best conditions.

According to the invention, the prestretched web, taken to the desired temperature (for said stretching) in contact with the drive roll by partial, regulated and controlled cooling, is immediately stretched in a single step by pulling it using a pair of rollers the instant when the web, at the suitable temperature, leaves said drive roll tangentially.

Unlike the conventional stretching unit used in the prior art, which comprises two pairs of rollers rotating at different speeds, one for forwarding the web and the other for stretching it, the roll for driving the web, which also prestretches it and partially cools it in a regulated and controlled manner, also fulfils the function of a forwarding roll delivering the web to be stretched when it has been taken to the temperature most favorable for this operation.

After the web to be stretched has left the drive roll tangentially, it is taken up by a pair of rollers, placed downstream of said roll, which constitutes the pair of rollers for the actual stretching of the delivered web, by applying the desired stretch ratio thereto. This pair of stretching rollers, placed downstream of the drive roll, is heated to a temperature of between 40° C. and 165° C. and preferably between 55° C. and 135° C.: this temperature may be identical to or different from that of the drive roll. The stretch ratio according to the invention, given by the ratio of the linear speeds delivered by the pair of stretching rollers and the roll for driving (prestretching, cooling and forwarding) the web and taken to the temperature suitable for the stretching operation, is chosen within the 1.5 to 10 range and preferably chosen within the 2 to 6 range.

However, it is also possible, according to the invention, for the web (which is prestretched), taken to the desired temperature by partial, regulated and controlled cooling in contact with the drive roll, to be stretched in several successive steps. In this case, the first stretching step, called tangential stretching, is carried out immediately (as mentioned above) by pulling it using a pair of rollers placed downstream of the drive roll where the web (which is at the suitable stretching temperature of between 40° C. and 165° C.) leaves said drive roll tangentially. In this first step, the web is stretched to a fraction of the desired total stretch: this fraction lies between 80% and 20% of the total stretch envisioned.

After this first stretching step, the partially stretched film may undergo relaxation by passing over a suitable roll (called relaxation roll), the temperature of which is chosen within the 125° C. to 20° C. range.

After leaving the relaxation roll, the relaxed film is reheated and taken to the desired temperature by passing over a reheating roll, in order to continue and/or complete the stretching operation: the temperature to which the partially stretched film is reheated during the first step is chosen within the 40° C. to 165° C. range.

After leaving the reheating roll, the partially stretched film, taken to the desired temperature for continuing the stretching operation, enters a conventional stretching zone which comprises two pairs of rollers rotating at different speeds, one for forwarding the web and the other for stretching it: the stretching of the film may be completed in this conventional stretching zone.

If the web is stretched in two successive steps, that fraction of the stretch introduced in the second step lies between 20% and 80% of the total stretch envisioned.

If the web is stretched successively in three or more steps, that fraction of the stretch introduced in the first step lies between 20% and 70% of the total stretch envisioned, that fraction of the stretch introduced in the second step lies between 15% and 70% of the total stretch envisioned and that fraction of the stretch introduced in the other steps, including the final stretching step (by sharing) lies between 15% and 70% of the total stretch envisioned.

When the number of stretching steps is greater than two, the same abovementioned means, for relaxing the film, reheating the film, stretching the film and relaxing/cooling the film at the end, are again placed downstream of the second stretching step, which means are repeated as many times as there are stretching steps.

The microporous film after the stretching operation is completely cooled by a suitable relaxation and cooling station formed, for example, by one or more rolls in cascade, these decreasing the temperature down to the desired temperature for storing the film.

The stretched film, beyond the zone for stretching the web and for converting it into a microporous film, may undergo a heat treatment allowing the tensile stresses induced in the film throughout the manufacturing process to be relaxed. However, it will be recalled that since one of the objects of the invention is to produce a microporous film (having at least one layer) in as isotropic a physical state as possible after stretching the web, the abovementioned internal tensile stresses are smaller (in the film according to the invention) than those generated in the films according to the prior art:

as, according to the invention, the prestretched web is taken to its stretching temperature by the drive roll, whereas, according to the prior art, the prestretched web is uncontrollably cooled by the drive roll to a temperature below that necessary for stretching it and then subsequently reheated to the stretching temperature in order to be able to be stretched.

The stretching method used according to the invention is much gentler than that used in the prior art.

In the same way that the extruded web may undergo an embossing operation by means of the drive roll, the film may undergo an embossing operation in various zones of the process according to the invention.

If said process comprises only a single stretching step (called tangential stretching step), the film may undergo an embossing operation in one or more subsequent zones of said process:

a) in the tangential stretching zone, using the pair of rollers for stretching the web which is placed downstream of said drive roll, as an embossing means;

d) in the zone for relaxing the stretched film, using at least one of the relaxation rolls as embossing means.

If said process comprises several stretching steps, the film may undergo an embossing operation in the next zone and/or zones of said process:

a) in the tangential stretching zone using, as previously, the pair of rollers for stretching the web, placed downstream of said drive roll, as embossing means;

b) in the reheating zone which precedes the second stretching step, using the reheating roll as embossing means;

c) in the second stretching zone, where the stretching of the film from the tangential stretching step is continued, comprising two pairs of rollers rotating at different speeds, one of the pairs being for forwarding and rotating at a speed close to the reheating roll, the other for stretching and rotating at a speed greater than the pair for forwarding the film to be stretched, using one or both pairs of rollers as embossing means;

d) in the zone for relaxing the stretched film, using at least one of the relaxation rolls as embossing means.

Just as the web may be embossed before the stretching operation, the film may be embossed in the stretching, relaxation, reheating and relaxation/cooling zones, by means of the surface of at least one of the rollers of the stretching and/or forwarding pairs, of the relaxation and/or reheating rolls and/or of the relaxation/cooling rolls: the surface of the roller or rollers and/or of the roll or rolls intended for embossing the film is provided with a regular or irregular pattern, in the form of projections and/or indentations, the most frequent shapes of which may, for example, be lines in the longitudinal, transverse or diagonal direction with respect to the direction of advance of the film, these being parallel or intersecting one another in order to form geometrical figures, chevrons of greater or lesser flare angle, sinusoids, toothings or else figures such as polygonal or circular figures (in the form of a hexagon, diamond or circle) or figures having a random distribution. If the embossing is desired for the appearance and final qualities of the film, this embossing may be carried out one or more times in the process according to the invention.

When the embossing is carried out only once, this may be done on the web before it is stretched by means of the drive roll (zone a)) or on the film in one of the abovementioned zones b) or c) or d).

When the embossing is carried out several times, this may be done by combining, for example:

the embossing of the web (zone a)) with the embossing of the film in at least one of the zones b), c), d);

the embossing of the single film by combining at least two of th e embossing zones b), c), d).

Likewise, the microporous film according to the invention undergoing stretching in the longitudinal direction may also undergo, beyond this first stretching, another, but transverse, stretching. In this case, the transverse stretching is carried out by means of known devices with a stretch ratio generally between 1.1 and 10 and preferably between 1.1 and 4.

Finally, after these various steps, carried out within the context of the process according to the invention, the microporous stretched film is stored continuously on a suitable support at a linear winding speed of 0.5% to 25% less than the linear speed of the film coming from the previous step, in order to allow it to relax, particularly from the longitudinal stretching step when the heat treatment step is not carried out.

Thus, the process according to the invention results in a reduction in the stretching forces by carrying out the stretching at the most favorable temperature without having to make it undergo uncontrolled cooling followed by considerable reheating in order to meet the thermal conditions for the stretching operation.

When the process according to the invention relates to the manufacture of a monolayer microporous film, that is to say one formed from just the main layer having a high mechanical strength, this film is produced by means of a single extruder feeding the flow-extrusion flat die.

However, when the process according to the invention relates to the manufacture of a multilayer microporous film, the film may be produced by means of several extruders, i.e. as many extruders as there are compositions of layers, which feed a flat die provided with a coextrusion device.

The molten web, formed from several flow-coextruded layers, then undergoes the same steps as those mentioned above for forming a monolayer microporous film, i.e.:

prestretching by the drive roll;

partial and limited cooling in a controlled manner of the prestretched web by taking it, by means of the drive roll, to a temperature lying within the desired temperature range for stretching it;

stretching the web by pulling on it at the moment when it leaves said drive roll tangentially, possibly controlled by a downstream back-up roll, this roll also acting as a roller for forwarding the web in order to stretch it.

To demonstrate the effect of the invention on the microporous films obtained according to the process, an orientation index for determining the physical state of the film or its tendency toward isotropy was established. This index is formed by the ratio of the values of the mechanical properties of the films measured in the machine direction to those measured in the transverse direction (MD/TD). If a film is absolutely isotropic, this ratio is equal to 1. If a film is completely oriented in the machine direction, that is to say a nonisotropic film, this ratio tends toward infinity.

When the mechanical properties of the films, such as the tensile strength, elongation as break and the loads at 5%, 10%, 15% and 25% elongation, are measured, the index of the film according to the invention is always between the value 1 and the value of the index of the film produced according to the prior art.

More precisely, and for the aforementioned mechanical properties (except for the elongation at break), the index of the film according to the invention is from 1.4 to 2 times smaller than the index of the film according to the prior art and tends toward the value 1, showing its ability to be more isotropic than films according to the prior art.

The microporous film according to the invention can be used by itself or combined with other porous supports such as, for example, nonwoven fabrics, woven fabrics, knits, net-type meshes and paper, for various applications such as body hygiene articles, bandages, medical articles, protective clothing, sports clothing, insulating coverings in the building industry, and other applications.

Figure 1:
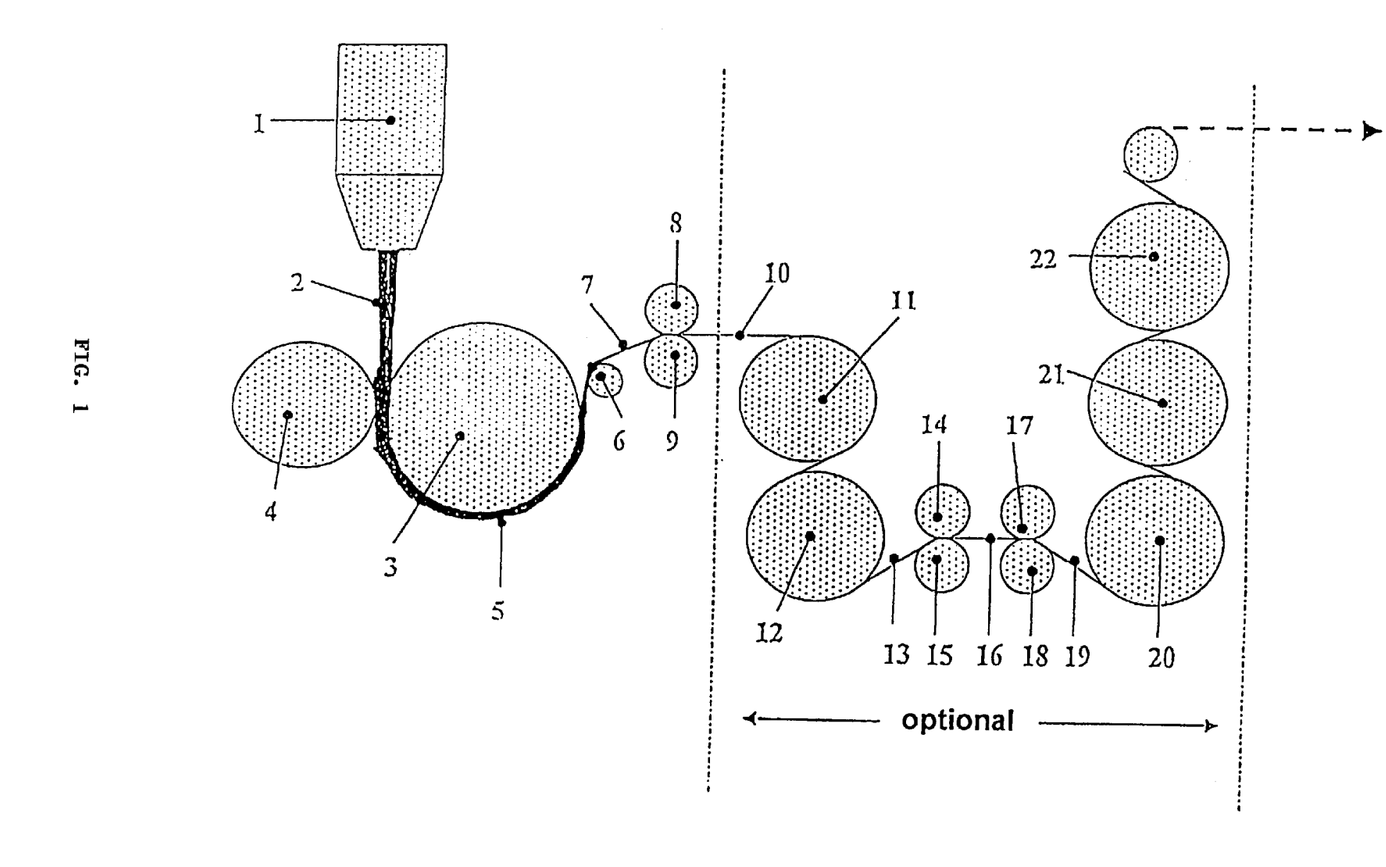
FIG. 1 schematically illustrates the extrusion line for processing the composition comprising polyolefin and filler.

In order to better understand the invention, the process is described according to the single figure for the particular case of the process with two-step stretching, this in no way, having any limiting effect on its scope.

According to this figure, the compound, consisting of the polyolefin matrix and the filler, is melt processed by extruding it through the flat die (1) at the temperature specific to said compound.

The thick web (2) formed is prestretched by the drive roll (3) having a matt metal surface combined with a back-up roll (4) with a rubberized surface, to a suitable and chosen amount of stretch. The surface of the drive roll may be provided with a regular or irregular pattern, in the form of indentations or projections, in order to allow the web to be embossed. The web (2) prestretched by the drive roll is partially cooled thereon, by being in contact with it, down to the temperature necessary for the first step of a two-step stretching operation. The time during which the web (5) is in contact with the drive roll (3) is controlled by the back-up roll (6) which, depending on its position, increases or decreases the length of the arc over which the roll (3) is wrapped by the web (5): the point where the web (5) leaves tangentially is controlled by the back-up roll (6).

As soon as the web (5) to be stretched leaves the drive roll (3) tangentially, it is taken up by a pair of rollers (8) and (9), placed downstream of said roll (3), which constitutes the pair of stretching rollers tangential to the first, partial stretching step, by applying the desired stretch ratio to it. Thus, the web (5) is stretched into the film (7) between the drive roll (3) and the pair of rollers (8) and (9). The cylindrical surface of at least one of the rollers (8) and (9) may be provided with patterns, like those mentioned above, in order to allow the film to be embossed.

After leaving this first stretching step, the partially stretched film (10) undergoes relaxation by passing over the roll (11) whose temperature is regulated within the abovementioned range.

After leaving the relaxation roll, the relaxed film (10) is reheated on the roll (12) and, in contact with it, taken to the desired temperature for completing its stretching in a second step. The temperature of the roll (12) is set to a value chosen within the abovementioned range. In addition, the cylindrical surface of the roll (12) may be provided with patterns, as mentioned above, in order to allow the film to be embossed as it is being reheated. In the case of the embossing of the relaxed and reheated film, the roll may be provided with a back-up roll with a rubberized surface (not shown).

The partially stretched film (13), taken to the desired temperature, enters a conventional stretching zone (second stretching step) which comprises two pairs of rollers rotating at different speeds, one pair [the rollers (14) and (15)] for forwarding the film and the other pair [the rollers (17) and (18)] for stretching it: the stretching of the film (13) into the film (16) is completed between these two pairs of rollers. The cylindrical surface of at least one of the rollers (14) and (15) and/or of the rollers (17) and (18) may be provided with patterns in the form of indentations or of projections (as indicated above) in order to allow the film to be embossed.

After leaving the pair of rollers (17) and (18) of the second stretching step, the stretched film (19) enters a relaxation station comprising, in cascade, the rolls (20), (21) and (22) delivering the stretched and possibly embossed film (23) at a chosen temperature for storing it on a reel. The cylindrical surface of the roll (20) may be provided with patterns, such as those mentioned above, in order to allow the film to be embossed after the final stretching step.

Thus, the embossing may be carried out either on the web, or on the film, or successively on the web and then the film, in as many steps as deemed to be desirable for the final quality of the film.

The invention will be more clearly understood by means of the examples given below, the physical properties of the films obtained having been determined according to the ASTM standards indicated.

EXAMPLE 1

In order to determine the orientation index of the physical state (mentioned above) of films manufactured according to the invention and according to the prior art, three films were produced (with reference number 3 for the invention and reference numbers 1 and 2 for the prior art) on the same flat die extrusion line of a pilot plant which comprised:

a 45 mm diameter COLLIN extruder (300 mm die with a 0.6 mm opening);

a drive-cooling-embossing roll (125 mm in diameter) and a rubber back-up roll (125 mm in diameter).

The composition of the three films was the same: it consisted of a compound based on a polyolefin matrix and a $CaCO_3$ filler (having a diameter of between 1 and 5 µm) in an amount of 110 parts by weight of the filler per 100 parts by weight of the matrix.

The polyolefin matrix was formed from:

| | |
|---|---|
| a 50/50% blend of an LDPE homopolymer and an ethylene/alpha- olefin copolymer, constituting the polyolefin part of the masterbatch sold under the reference AMPACET 100196 by Ampacet Europe; | 42.6% |
| an ethylene/octene copolymer (plastomer) sold under the brand AFFINITY PL 1845 by Dow Chemical; density: 0.910 g/cm³; melt flow index: 2.5 g/10 min (ASTM 1238) | 57.4% |

The webs (references 1, 2 and 3) obtained by flow extrusion of the compound and then prestretched by means of the drive-cooling-embossing roll had thicknesses at the entrance of the roll of 80 to 85 µm. The film (reference 3) according to the invention was partially cooled on the drive-cooling-embossing roll to a temperature of 60° C., desired for stretching it, and immediately stretched at this temperature will a stretch ratio of 4 as soon as it leaves said roll tangentially, determined by the presence of a back-up roll.

The films (references 1 and 2) were cooled on the drive-cooling-embossing roll to a temperature of 30° C. and then, after leaving the cooling zone, were reheated to 60° C. in the case of reference film 1 and 80° C. in the case of reference film 2, and they were then stretched at these temperatures with a stretch ratio of 4 on a suitable stretching unit. All the physical properties of the films, and the corresponding index, are given in Table 1 below.

TABLE 1

| Property | Measurement unit | Standards | (x) Ref. 1 60° C. | (xx) Ref. 2 80° C. | (xxx) Ref. 3 60° C. |
|---|---|---|---|---|---|
| Grammage | g/m² | | 34 | 32.8 | 34 |
| Thickness (calculated) | μm | ACE | 26.1 | 25.2 | 26 |
| Embossed thickness | μm | ASTM E 252 | 43 | 38 | 40.6 |
| Load at break | N/inch | ASTM D 882 | | | |
| MD | | | 30.3 | 27.4 | 24.6 |
| TD | | | 2.4 | 2.4 | 3.1 |
| MD/TD | | | 12.6 | 11.4 | 7.9 |
| Elongation at break | % | ASTM D 882 | | | |
| MD | | | 70 | 63 | 77 |
| TD | | | 368 | 319 | 348 |
| MD/TD | | | 0.19 | 0.20 | 0.22 |
| Load at 5% elongation | N/inch | ASTM D882 | | | |
| MD | | | 6.28 | 6.41 | 6.56 |
| TD | | | 0.82 | 1 | 1.69 |
| MD/TD | | | 7.7 | 6.4 | 3.9 |
| Load at 10% elongation | N/inch | ASTM D 882 | | | |
| MD | | | 12.05 | 11.86 | 11.28 |
| TD | | | 1.3 | 1.42 | 1.89 |
| MD/TD | | | 9.3 | 8.4 | 6.0 |
| Load at 15% elongation | N/inch | ASTM D 882 | | | |
| MD | | | 16.78 | 16.21 | 14.75 |
| TD | | | 1.53 | 1.57 | 1.98 |
| MD/TD | | | 11.0 | 10.3 | 7.4 |
| Load at 25% elongation | N/inch | ASTM D 882 | | | |
| MD | | | 22.85 | 21.57 | 18.53 |
| TD | | | 1.66 | 1.68 | 2.07 |
| MD/TD | | | 13.8 | 12.8 | 9.0 |
| Breathability | second | ACE | 5 | 4.5 | 7 |
| Water-vapor permeability at 38° C., 90% RH | G/m²/24 h | ASTM E-96 | 5700 | 6000 | 4500 |
| Resistance to water column | m | EDANA 120-1-80 | 1.43 | 1.45 | 1.27 |

(x) according to the prior art
(xx) according to the prior art
(xxx) according to the invention.

EXAMPLE 2

A three-layer polyolefin microporous film, permeable to gases but impermeable to liquids, was produced by the process of the invention by means of an industrial plant, the specific layers being layers of low melting point in order to make it easier for said film to be subsequently joined, hot, to a nonwoven fabric.

The main (internal) layer of the finished film had a thickness of 20 μm, while the specific (external) layers each had a thickness of 2.5 μm.

In order to produce such a film, the composition of the main layer was the same as that described in Example 1.

As regards the two specific (external) layers of the same composition, they were also composed of a polyolefin matrix, a mineral filler and various specific agents, the mineral filler being present in the compound in an amount of 110 parts by weight per 100 parts by weight of the olefin matrix.

The polyolefin matrix of the specific layers was formed from 3 polymers in the following percentages by weight:

| | |
|---|---|
| a 50/50% blend of an LDPE homopolymer and an ethylene/alpha-olefin copolymer, constituting the polyolefin part of the masterbatch sold under the reference AMPACET 100196 by Ampacet Europe; | 35.8% |
| a very low-density polyethylene sold under the brand AFFINITY KC 8852 by Dow Chemical; | 64.2% |

*density: 0.875 g/cm³;
*melt flow index: 3 g/10 min

The mineral filler was composed of $CaCO_3$ the particles of which had a diameter of between 1 μm and 5 μm. Various agents, such as a biocide (in particular an acaricide), a lubricant, a heat stabilizer, etc., were introduced into the matrix in the usual amounts.

Each dry blend intended for each layer was extruded in an extruder specific to each layer.

The three extruders working in parallel fed a flat die provided with a coextrusion device.

The temperature of the flat die and of the flow-extruded three-layer web was about 200° C. and the lip of the open die between 0.3 and 2 mm.

The extruded web, formed from three layers, was taken up between the metal drive roll and a back-up roll provided with a rubber coating.

The three-layer web was thinned down by a factor of about 10.

The temperature of the metal drive roll was set at 65° C. so that the web was heated to this same temperature. As in Example 1, the metal drive roll acted on the molten web by:

- the drive function;
- an effect of stabilizing the temperature of the prestretched web by making it come to the desired temperature for the stretching step by partial and controlled cooling of the flow-extruded web;
- the creation of a rough configuration on the web, with a depth of between 2 μm and 3 mm, by embossing it on the metal roll, the surface of which is provided with projecting patterns;
- by another function, namely that of the roller for forwarding the prestretched web and taken to a suitable temperature, delivering said web in order to stretch it, as soon as it leaves tangentially.

The actual stretching of the web was carried out in the longitudinal direction at a temperature of 65° C. with a stretch ratio of 3 to 4.

The microporous film thus obtained did not undergo further treatments: it was slit in line and then wound for the purpose of its applications.

The physical properties of the three-layer film are given in Table 2 below:

TABLE 2

| Measured properties | Measurement unit | Standard | Values measured on the films according to the invention | |
|---|---|---|---|---|
| | | | Three-layer coextruded film | Mono-layer film |
| Grammage | g/m² | | 33 | 33 |
| Thickness | μm | ASTM E 252 | 25.5 | 25.6 |
| Tensile strength | N/25 mm | ASTM D 882 | | |
| machine direction | | | 18.1 | 18.5 |
| transverse direction | | | 2.5 | 3.7 |
| Elongation at break | % | ASTM D 882 | | |
| machine direction | | | 162 | 175 |
| transverse direction | | | 367 | 310 |
| Breathability | Second | ACE EDANA 120-1-80 | 14 | 16 |
| Resistance to water column | cm | ASTM D 882 | >100 | >100 |
| Strength of the weld produced: | | | | |
| at 75° C. | | | peelable | 0 |
| at 80° C. | | | welded | 0 |
| at 100° C. | | | welded | peelable |
| at 105° C. | | | welded | welded |

What is claimed is:

1. A process for producing a microporous film having a high isotropic tendency, that is permeable to gases but impermeable to aqueous liquids, said film comprising at least one layer, comprising the following successive steps:
   (a) forming a mixture comprising a polyolefin matrix which comprises at least one polymer and at least one mineral and/or organic filler;
   (b) extruding a web comprising at least one layer of said mixture by melt flow;
   (c) prestretching the web upon contact with a drive roll;
   (d) cooling and solidifying the prestretched web by contact with said drive roll, wherein said cooling of the prestretched web is partial and limited to a temperature within the range permitting further stretching of said web; and
   (e) further stretching the solidified web, at a temperature suitable for forming a microporous film, wherein said further stretching is achieved by pulling said web at the moment when tangential separation from said drive roll occurs, said roll acting as a forwarding roll for said further stretching operation.

2. The process as claimed in claim 1, wherein the point where the web leaves the drive roll tangentially is controlled by a back-up roll, which fixes the arc length over which the web is in contact with said drive roll.

3. The process as claimed in claim 1, wherein when the film comprises a single layer, or main layer, the polyolefin matrix is formed from olefin polymers and/or copolymers obtained by polymerization in the presence of catalysts of the Zielger-Natta type or of the metallocene type, which are selected from the group consisting of ethylene/alpha-olefin copolymers, homopolymer polyethylenes, radical low-density polyethylenes, or ethyl/vinyl acetate, ethylene/methyl acrylate, ethylene/ethyl acrylate and ethylene/acrylic acid copolymers, and ionomers, polypropylenes, metallocene polypropylenes and propylene/ethylene and propylene/alpha-olefin copolymers, and mixtures thereof.

4. The process as claimed in claim 1, wherein nonpolar polyolefins used in the mixture have a density which ranges between about 0.865 g/cm³ (3.124×10⁻² lb/in³) and about 0.965 g/cm³ (3.486×10⁻² lb/in³).

5. The process as claimed in claim 4, wherein the nonpolar polyolefins used in the mixture have a density which ranges between about 0.900 g/cm3 (3.251×10⁻² lb/in³) and 0.935 g/cm3 (3.378×10⁻² lb/in³).

6. The process as claimed in claim 1, wherein the mineral filler used in the mixture is selected from the group consisting of calcium carbonate, talc, a clay, kaolin, silica, diatomaceous earth, magnesium carbonate, barium carbonate, magnesium sulfate, barium sulfate, calcium sulfate, aluminum hydroxide, magnesium hydroxide, calcium oxide, magnesium oxide, zinc oxide, titanium oxide, alumina, mica, glass powder, a zeolite and mixtures thereof.

7. The process as claimed in claim 6, wherein the mineral filler used in the mixture comprises calcium carbonate, barium sulfate, and mixtures thereof.

8. The process as claimed in claim 6, wherein the mineral filler is treated with a treatment agent selected from the group consisting of fatty acids or their salts, silicone oils and silanes.

9. The process as claimed in claim 1, wherein the organic filler used in the mixture is selected from the group of powders consisting of cellulosic polymers, polyurethanes, epoxies, acrylonitrile butadiene styrene polymer, polyfluorinated polymers, polyamides, polyesters, and mixtures thereof.

10. The process as claimed in claim 1, wherein the size of the filler particles is less than about 40 μm (1.575×10⁻³ in).

11. The process as claimed in claim 10, wherein the size of the filler particles ranges between about 0.5 μm (1.968× 10⁻⁵ in) and about 10 μm (3.937×10⁻⁴ in).

12. The process as claimed in claim 1, wherein the amount of filler used in the mixture ranges between about 50 and about 500 parts by weight per 100 parts by weight of the polyolefin matrix.

13. The process as claimed in claim 12, wherein the amount of filler used in the mixture ranges between about 80 and about 400 parts by weight per 100 parts by weight of the polyolefin matrix.

14. The process as claimed in claim 1, wherein the web is hot flow-extruded through a flat die forming a molten web with a thickness ranging between about 300 μm (0.0118 in) and 2000 μm (0.0787 in) on exiting the die.

15. The process as claimed in claim 14, wherein the dispersing agent has the formula:

R-(P)$_x$-(Q)$_y$-Z where Z comprises at least one free-acid functional group, selected from the group consisting of carboxylic, sulfonic, sulfuric, phosphonic or phosphoric acid radicals, (P) is ethylene oxide, (Q) is propylene oxide, where 0≦(x+y)<24, and R is selected from the group consisting of saturated or unsaturated, linear or nonlinear alkyl radicals, aryl radicals, alkaryl radicals, saturated or unsaturated heterocycles, containing from about 5 to about 28 carbon atoms, and a steroid radical.

16. The process as claimed in claim 15, wherein R is selected from the group consisting of saturated or unsaturated, linear or nonlinear alkyl radicals, aryl radicals, alkaryl radicals, saturated and unsaturated heterocycles, containing from 8 to 24 carbon atoms, or a steroid radical.

17. The process as claimed in claim 15, wherein when Z comprises several acid functional groups, at least one of said acid functional groups is free, the others being salified or esterified by an alcohol of formula R'—OH in which R' is selected from the group consisting of a carbon chain containing from about 1 to about 4 carbon atoms or one of the radicals selected from the group consisting of saturated or unsaturated, linear or nonlinear alkyl radicals, aryl radicals, alkaryl radicals, saturated or unsaturated heterocycles, containing from 8 to 24 carbon atoms, and a steroid radical.

18. The process as claimed in claim 15, wherein R comprises at least one functional group selected from the group consisting of halogen, —OH, —COOH, —COOR, —NO$_2$, —NH$_2$, —CONH$_2$, —CN, sulfonic, sulfuric, phosphonic and phosphoric type.

19. The process as claimed in claim 15, wherein the radical R' is identical to the radical R.

20. The process as claimed in claim 1, wherein the mixture formed by the polyolefin matrix and the filler further comprises lubricants, pigments, dyes, heat stabilizers, photochemical stabilizers, fire retardants, plasticizers, antistatic agents, and biocides.

21. The process as claimed in claim 1, wherein when the web comprises several layers, the olefin components of the mixture in each specific layers comprise at least one olefin polymer and/or copolymer selected from the group consisting of polyolefins having a density ranging between about 0.865 g/cm$^3$ (3.124×10$^{-2}$ lb/in$^3$) and about 0.915 g/cm$^3$ (3.306×10$^{-2}$ lb/in$^3$) and/or a melting point ranging between about 60° C. (140° F.) and about 100° C. (212° F.), polyolefins having a density ranging between 0.920 g/cm$^3$ (3.324×10$^{-2}$ lb/in$^3$) and 0.965 g/cm$^3$ (3.486×10$^{-2}$ lb/in$^3$) and/or having a melting point ranging between about 100° C. (212° F.) and about 160° C. (320° F.), polar polyolefins, ethylene/vinyl acetate, ethylene/methyl acrylate, ethylene/ethyl acrylate, ethylene/acrylic acid copolymers, ionomers, and polyolefins modifying a surface finish of the layer.

22. The process as claimed in claim 21, wherein the polyolefin component of the mixture in each specific layer comprises about 5% to about 100% by weight, with respect to the total mass of said polyolefin component, of at least one specific olefin polymer and/or copolymer and of at most about 95% of at least one olefin polymer and/or copolymer used in the matrix of the main layer.

23. The process as claimed in claim 22, wherein the polyolefin component of the mixture in each specific layer comprises about 5% to about 100% by weight, with respect to the total mass of said polyolefin component, of at least one specific olefin polymer and/or copolymer and of at most about 85% of at least one olefin polymer and/or copolymer used in the matrix of the main layer.

24. The process as claimed in claim 22, wherein the polyolefin component of the mixture in each specific layer comprises about 15% to about 100% by weight, with respect to the total mass of said polyolefin component, of at least one specific olefin polymer and/or copolymer and of at most about 95% of at least one olefin polymer and/or copolymer used in the matrix of the main layer.

25. The process as claimed in claim 24, wherein the polyolefin component of the mixture in each specific layer comprises about 15% to about 100% by weight, with respect to the total mass of said polyolefin component, at least one specific olefin polymer and/or copolymer and of at most about 85% of at least one olefin polymer and/or copolymer used in the matrix of the main layer.

26. The process as claimed in claim 20, wherein one or more of the specific layers comprise:
a) a mineral filler selected from the group consisting of calcium carbonate, talc, a clay, kaolin, silica, diatomaceous earth, magnesium carbonate, barium carbonate, magnesium sulfate, barium sulfate, calcium sulfate, aluminum hydroxide, magnesium hydroxide, calcium oxide, magnesium oxide, zinc oxide, titanium oxide, alumina, mica, glass powder, a zeolite and mixtures thereof, and/or
b) an organic filler selected from the group of powders consisting of cellulosic, polymers, polyurethanes, epoxies, acrylonitrile butadiene styrene polymer, polyfluorinated polymers, polyamides, polyesters, and mixtures thereof; and
c) a polyolefin,
wherein the amount of filler used in the mixture ranges between about 50 and about 500 parts by weight per 100 parts by weight of the polyolefin matrix.

27. The process as claimed in claim 21, wherein the one or more specific layers comprise:
a) a mineral filler selected from the group consisting of calcium carbonate, talc, a clay, kaolin, silica, diatomaceous earth, magnesium carbonate, barium carbonate, magnesium sulfate, barium sulfate, calcium sulfate, aluminum hydroxide, magnesium hydroxide, calcium oxide, magnesium oxide, zinc oxide, titanium oxide, alumina, mica, glass powder, a zeolite, and mixtures thereof; and/or
b) an organic filler selected from the group of powders consisting of cellulosic, polymers, polyurethanes, epoxies, acrylonitrile butadiene styrene polymer, polyfluorinated polymers, polyamides, polyesters, and mixtures thereof; and
c) a polyolefin, wherein the amount of filler used in the mixture ranges between about 80 and about 400 parts by weight per 100 parts by weight of the polyolefin matrix.

28. The process as claimed in claim 1, wherein the web is hot flow-extruded through a flat die forming a molten web with a thickness ranging between about 300 μm (0.0118 in) and 2000 μm (0.0787 in) on exiting the die.

29. The process as claimed in claim 1, wherein a multiplicity of microporous webs are formed, the mixtures corresponding to the various webs are melt extruded by at least as many extruders as there are webs of different mixture, these extruders feeding a flat die provided with means for flow-coextrusion, forming a molten web of thickness ranging between about 300 μm (0.0118 in) and about 2000 μm (0.0787 in) on exiting the die.

30. The process as claimed in claim 1, wherein the temperature of the molten web upon extrusion is between about 170° C. (338° F.) and about 270° C. (518° F.).

31. The process as claimed in claim 1, wherein the molten flow-extruded web is prestretched by means of a drive roll with a stretch ratio within the range about 4/1 to about 25/1.

32. The process as claimed in claim 31, wherein the molten flow-extruded web is prestretched by means of a drive roll with a stretch ratio within the range about 5/1 to about 10/1.

33. The process as claimed in claim 1, wherein the prestretched web is partially cooled, in a controlled manner, by the drive roll, to a temperature permitting further stretching the web.

34. The process as claimed in claim 33, wherein the controlled temperature to which the web is partially cooled is within the range between about 40° C. (104° F.) and about 165° C. (329° F.).

35. The process as claimed in claim 34, wherein the controlled temperature to which the web is partially cooled is within the range between about 55° C. (131° F.) and about 135° C. (275° F.).

36. The process as claimed in claim 1, wherein the surface of the drive roll has a high coefficient of friction, is smooth, and exhibits a shine or matte surface.

37. The process as claimed in claim 1, wherein the surface of the drive roll is provided with a regular or irregular pattern, in the form of projections or of indentations, in shapes which are lines in the longitudinal, transverse or diagonal direction with respect to the direction of advance of the web, these being parallel or intersecting one another in order to form geometrical figures, chevrons of greater or lesser flare angle, sinusoids, toothings or polygonal or circular figures.

38. The process as claimed in claim 37, wherein the web, prestretched and cooled in a controlled manner to a defined temperature, is embossed by means of the drive roll.

39. The process as claimed in claim 1, wherein the stretching of the web, is carried out by pulling it at the moment said web leaves the drive roll tangentially, in a single step at a temperature ranging between about 40° C. (104° F.) and about 165° C. (329° F.).

40. The process as claimed in claim 39, wherein the stretching of the web, is carried out by pulling it at the moment said web leaves the drive roll tangentially, in a single step at a temperature ranging between about 55° C. (131° F.) and about 135° C. (275° F.).

41. The process as claimed in claim 39, wherein the stretch ratio of the web introduced at the exit of the drive roll is between about 1.5/1 and about 10/1.

42. The process as claimed in claim 41, wherein the stretch ratio of the web introduced at the exit of the drive roll is between about 2/1 and about 6/1.

43. The process as claimed in claim 1, wherein the web is stretched in several successive steps, the first step being conducted by pulling said web at the instant it leaves the drive roll tangentially:

a) at a temperature of between about 40° C. (104° F.) and about 165° C. (329° F.); and b) to between about 20% and about 80% of the total stretch desired.

44. The process as claimed in claim 43, wherein, when the stretching is carried out in two steps, a second step conducted in a second stretching zone comprising two pairs of rollers, one for forwarding and the other for further stretching the web, at a temperature ranging between about 40° C. (104° F.) and about 165° C. (329° F.) and to about 20% and about 80% of the total stretch desired.

45. The process as claimed in claim 43, wherein when the stretching is carried out in three steps, second and third steps are carried out in separate stretching zones, each comprising two pairs of rollers, one for forwarding and the other for stretching the web, the stretching temperature in the three steps is between about 40° C. (104° F.) and about 165° C. (329° F.), and the stretching effected:

a) in the first step, is between about 20% and about 70% of the total stretch;

b) in the second step, is between about 15% and about 70% of the total stretch; and c) in the third step, is between about 15% and about 70% of the total stretch.

46. The process as claimed in claim 43, wherein the partially stretched film coming from the first stretching step undergoes relaxation at a temperature of between about 125° C. (257° F.) and about 20° C. (68° F.) and is then reheated to a temperature of between 40° C. (107° F.) and 165° C. (329° F.) before entering the second stretching step.

47. The process as claimed in claim 43, wherein the stretched film undergoes a poststretching relaxation-cooling treatment.

48. The process as claimed in claim 46, after which the stretched film undergoes a poststretching relaxation-cooling treatment, wherein the stretched film undergoes at least one embossing step conducted during at least one of the stretching, relaxation, relaxation and reheating and relaxation and recooling steps using, as embossing means, the surface of at least one of the rollers used for the stretching, relaxation, relaxation and reheating, relaxation and cooling steps said surface being provided with an embossing pattern.

49. The process as claimed in claim 1, wherein the embossing is carried out in succession on the web and at least once on the film.

50. The process as claimed in claim 1, wherein the longitudinally stretched web is stretched transversely with a stretch ratio of between about 1.5/1 and about 10/1.

51. The process as claimed in claim 50, wherein the longitudinally stretched web is stretched transversely with a stretch ratio of between about 1.5/1 and about 4/1.

52. The process as claimed in claim 1, wherein the stretched film is stored on a suitable support, at a rate of from about 0.5% to about 25% less than that of the preceding stretching operation allowing for relaxation.

* * * * *